United States Patent
Pang

[19]

[11] Patent Number: 5,902,465
[45] Date of Patent: May 11, 1999

[54] APPARATUS FOR TREATING INDUSTRIAL WASTE WATER THROUGH ELECTROLYSIS

[75] Inventor: Yong-Chul Pang, Pusan, Rep. of Korea

[73] Assignee: Bong Shin Co., Ltd., Inchon, Rep. of Korea

[21] Appl. No.: 08/997,486

[22] Filed: Dec. 23, 1997

[30] Foreign Application Priority Data

May 22, 1997 [KR] Rep. of Korea ...................... 97-20063

[51] Int. Cl.⁶ ....................................................... C25B 9/00
[52] U.S. Cl. ........................ 204/212; 204/273; 204/272; 204/274; 204/222; 204/241
[58] Field of Search .................. 204/212, 273–274, 204/241, 668, 669, 670, 671

[56] References Cited

U.S. PATENT DOCUMENTS

| | | | |
|---|---|---|---|
| 808,095 | 12/1905 | Lang | 204/273 X |
| 3,119,759 | 1/1964 | Hoover | 204/212 |
| 4,121,991 | 10/1978 | Miller et al. | 204/272 X |
| 5,198,083 | 3/1993 | Thornton | 204/273 X |
| 5,788,820 | 8/1998 | Liu | 204/212 |

*Primary Examiner*—Donald R. Valentine
*Attorney, Agent, or Firm*—Antonelli, Terry, Stout & Kraus, LLP

[57] ABSTRACT

An apparatus for treating industrial wastes through electrolysis is disclosed. Steam or waste steam is utilized to heat the electrolyzing apparatus so as to separate contamination materials from the waste water, thereby treating the waste water. An electrolyzing tank has a waste water inlet on the bottom thereof, and a steam supply pipe is wound around the electrolyzing tank, for heating the electrolyzing tank during a passing of steam through the pipe. An insulating tube is formed inside the electrolyzing tank, and is coated with an insulating material on inside thereof, for insulating the electrolyzing tube from its contents. A cathode tube is installed within the insulating tank, for serving as a cathode during an electrolysis. An agitator having agitating blades is fixed on a shaft, the shaft is inserted into the center of the cathode tube, and anodes are attached on tips of the blades. An electrolyzing tank lid has a rotary joint at its center to rotatably retain an upper portion of the shaft of the agitator, and has a discharge hole for discharging the treated waste water. The treating efficiency can be drastically improved, a large scale treatment is possible, and the facility cost and the operating cost are low.

4 Claims, 3 Drawing Sheets

U.S. Patent May 11, 1999 Sheet 2 of 3 5,902,465

APPARATUS FOR TREATING INDUSTRIAL WASTE WATER THROUGH ELECTROLYSIS

BACKGROUND OF THE INVENTION

1. Field of the Invention

The present invention relates to an apparatus for treating industrial waste. Particularly, the present invention relates to an apparatus for treating industrial waste through electrolysis, in which steam or waste steam is utilized to heat the electrolyzing apparatus so as to separate contamination materials from the waste water (which is difficult to decompose), thereby treating the waste water.

2. Description of the Prior Art

Generally, conventional waste water treating methods include a chemical treating method using chemical compounds, a biological treating method using microbes, a physical treating method resorting to electrolysis and electric oxidation, and a combined method using two or more of the above methods.

The physical chemical treating methods include a method using an oxidizing agent, a suction method using active carbon, electrodialysis, and an ion exchange method. The method using an oxidizing agent has advantages that the oxidizing agent is well reacted with organic materials within the waste water, and that a secondary contamination material is not produced. However, the treating cost is very high, and the maintenance cost for the treating apparatus is considerable. Therefore, this method is not widely used except for special purposes. Further, the suction treating method using active carbon is good for removing odors. However, the price of the active carbon is high, and after some use, a regenerating treatment has to be carried out. Therefore, the maintenance and management thereof are difficult. Further, the electrodialysis and the ion exchange method are not suitable for treating large amounts of waste water.

In the conventional electrolyzing apparatus, a cathode and an anode are arranged within an electrolyzing tank, and waste water is electrolyzed in this manner. However, the reaction time is lengthy, and the consumption loss of the electrodes is high. Therefore, a large amount of sludge is produced, and therefore, the cost for treating the sludge is very high. Accordingly, this method is more suitable for small scale treatment. However, if it is to be applied to a large scale treatment, the facility cost is high, and the power consumption is also high. Therefore, the operating cost is high, and the electrolyzing capability is lowered.

According to the observations of the present inventor, the contamination materials contained within the waste water have intrinsic electric charges and active energies. Further, the contamination materials become unstable due to the electrostatic repulsions. Therefore, if a colloid of the contamination materials is to be made active, a proper amount of additional energy is required. Generally, the temperature of the waste water which is transferred from a storage to a electrolyzing apparatus is 16–20° C. When the electric power is supplied during the electrolysis, the temperature of the waste water is raised to 30–40° C. However, this temperature is too low to remove the contamination materials through electrolysis, and therefore, the electrolyzing efficiency is lowered. If the electric power is increased to raise the temperature, the power consumption is increased, with the result being that the operating cost becomes excessive. Further, if the power is increased to a proper temperature, then electrostatic charges are generated, and the electrodes are ionized, with the result being that the electrodes are corroded. Therefore, the life expectancy of the apparatus is shortened, and the maintenance cost is increased.

The present inventor found through experiments that if energy is added properly in accordance with the kinds of the waste water, the electrolyzing efficiency is remarkably improved. In order to put this phenomenon to a practical use, the present inventor came to propose the present invention.

SUMMARY OF THE INVENTION

Therefore, it is an object of the present invention to provide a waste water treating apparatus utilizing electrolysis, in which thermal energy is added to the waste water by utilizing steam or waste steam.

It is another object of the present invention to provide a waste water treating apparatus which can be applied to a large scale waste water treatment.

It is still another object of the present invention to provide a waste water treating apparatus in which an indirect heat, as opposed to a direct heat, can be added.

The indirect heat is supplied in the following manner. Specifically, steam or waste steam which is a residual steam of factories is supplied through a coiled pipe which is wound around the electrolyzing tank, thereby indirectly heating the electrolyzing tank.

In achieving the above object, the apparatus for treating industrial waste water through electrolysis by utilizing steam/waste steam according to the present invention includes: an electrolyzing tank having a waste water inlet on the bottom thereof; a steam supply pipe wound around the electrolyzing tank, for heating the electrolyzing tank during a passing of steam through the pipe; an insulating tank formed inside the electrolyzing tank, and coated with an insulating material on the inside thereof, for insulating the electrolyzing tank from its contents; a cathode tank installed within the insulating tank, for serving as a cathode during an electrolysis; an agitator having agitating blades fixed on a shaft, the shaft being inserted into the center of the cathode tank, and anodes being attached on tips of the blades; an electrolyzing tank lid having a rotary joint at its center to rotatably retain an upper portion of the shaft of the agitator, and having discharge hole for discharging a treated waste water; and an agitator motor installed upon the electrolyzing tank lid, for rotating the agitator. The electrolyzing tank is provided with legs to separate the waste water inlet from the ground.

Further, an outer tank is installed separately from the wound steam pipe, and a heat-insulating material is filled between the outer tank and the wound pipe, so that the heat of the wound pipe is not be dissipated.

BRIEF DESCRIPTION OF THE DRAWINGS

The above objects and other advantages of the present invention will become more apparent by describing in detail the preferred embodiment of the present invention with reference to the attached drawings in which.

DETAILED DESCRIPTION OF THE PREFERRED EMBODIMENT

Figure 1:
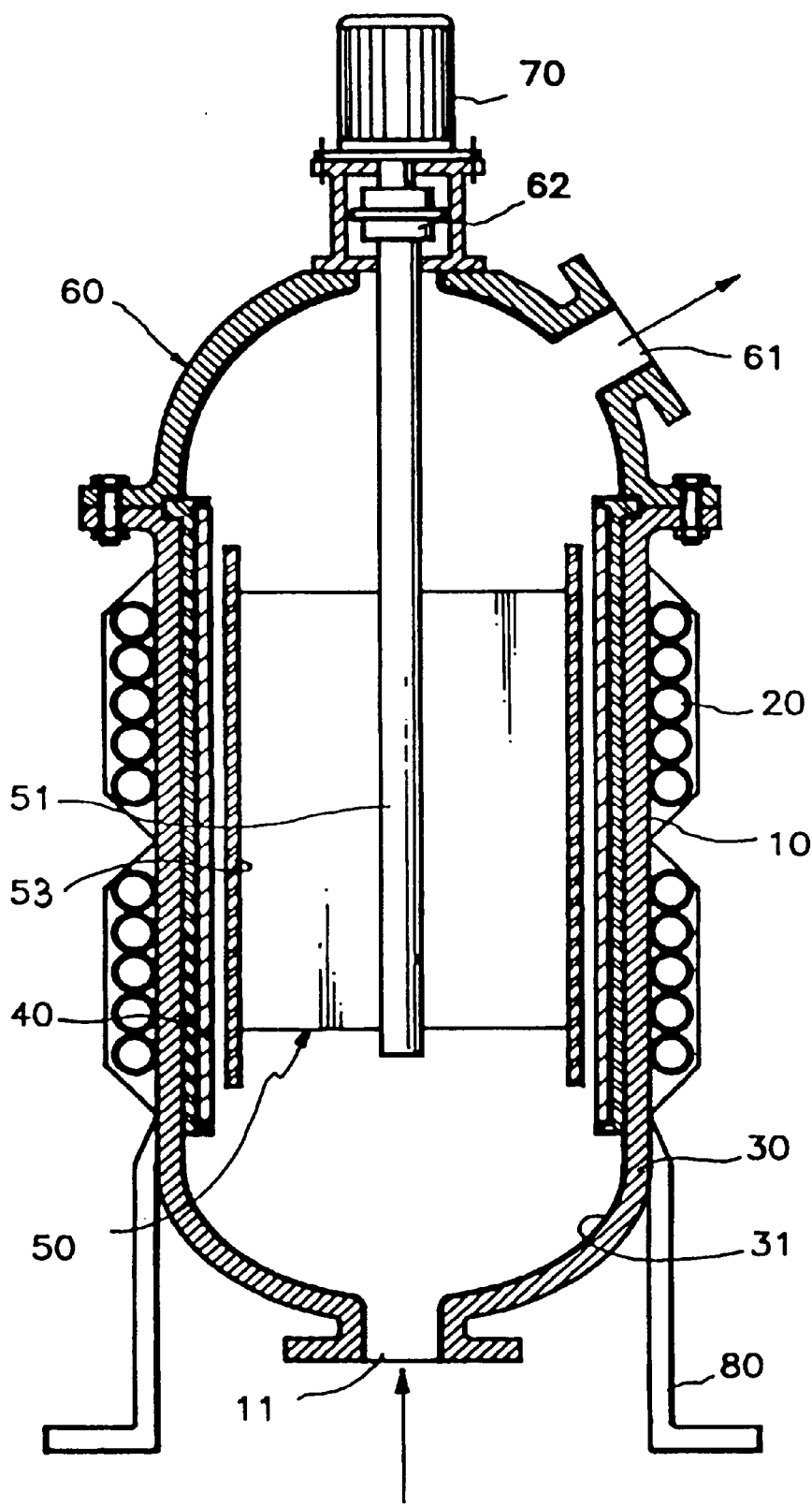
FIG. 1 is a side sectional view showing the constitution of the electrolysis-treating apparatus according to the present invention.
Figure 2:
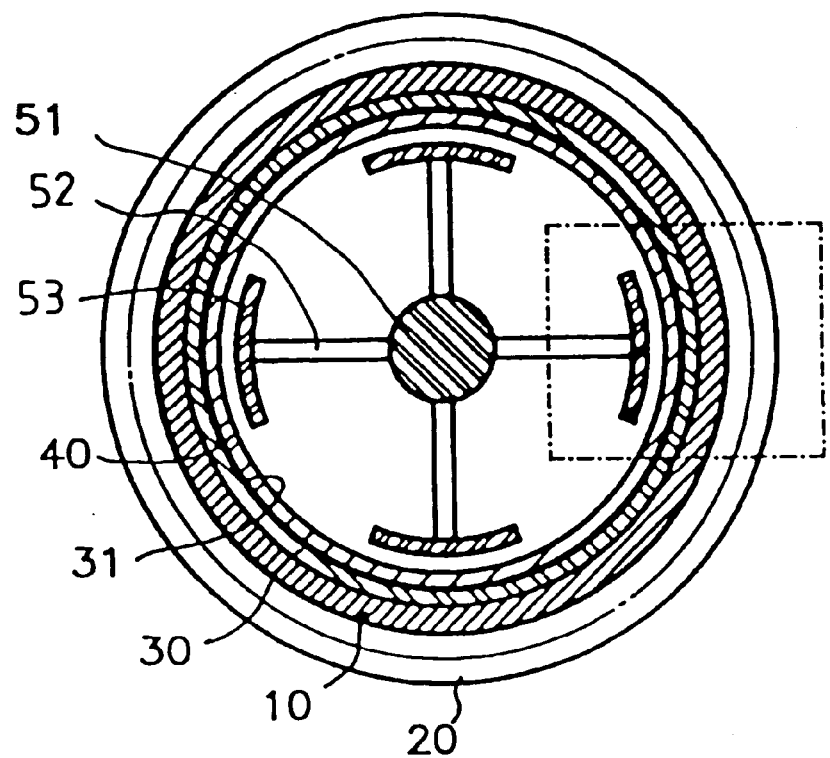
FIG. 2 is a plan sectional view showing the constitution of the electrolysis-treating apparatus according to the present invention.
Figure 3:
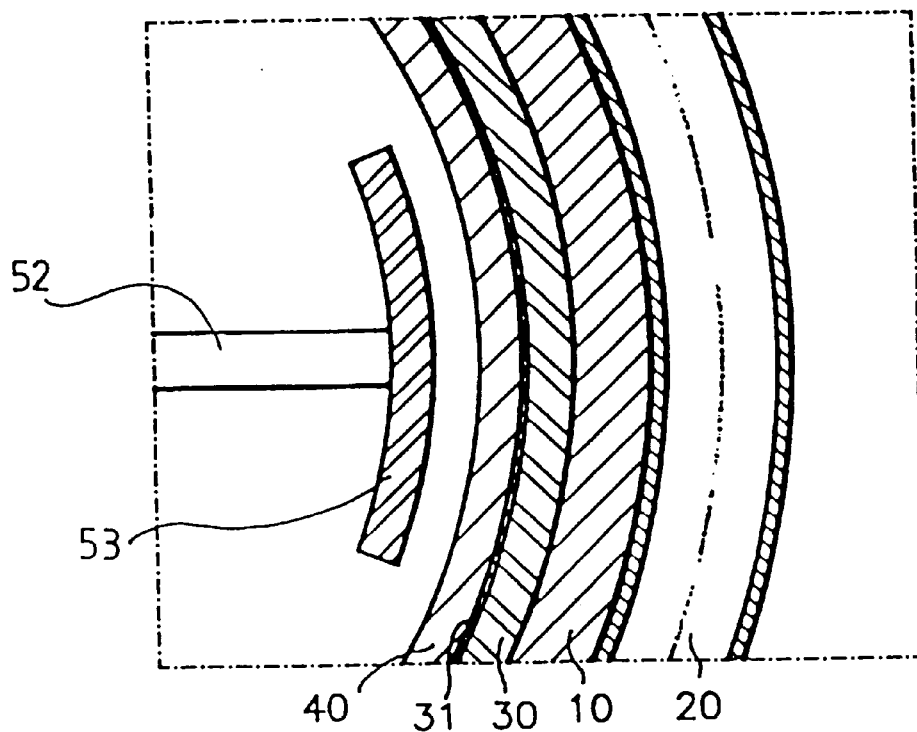
FIG. 3 is an enlarged sectional view of a critical portion of FIG. 2.

FIG. 1 is a side sectional view showing the constitution of the electrolysis-treating apparatus according to the present invention. As shown in this drawing, the size of an electrolyzing tank 10 is determined by the waste water treating capacity, and the electrolyzing tank 10 is provided with a waste water inlet 11 on the bottom thereof. A flange is formed on the top of the electrolyzing tank 10 so as to be coupled with a lid. Further, legs 80 extend downward, so that waste water inlet 11 is separated from the ground. Around the body of the electrolyzing tank 10, there is wound a steam pipe 20 which is supported by a clamp. Further, In the drawing, the steam pipe 20 is wound in the horizontal direction, but it can also be arranged in the vertical direction. In any case, the arrangement of the steam pipe 20 should be such that it can supply the heat to the electrolyzing tank 10 in a most efficient manner.

An insulating tank 30 is installed inside the electrolyzing tank 10, and an insulating material 31 is coated on the inside of the insulating tank 30. Inside the insulating tank 30, there is installed a cathode tank 40 which is insulated from the electrolyzing tank 10 by the insulating material 31. An agitator 50 is installed coaxially within the cathode tank 40, and anode plates 53 are attached on blades 52 of the agitator 50. The agitating blades 52 are attached on a shaft 51 of the agitator 50 in a radiative form. The anode plates 53 are detachably attached on the blades 52, and keep a certain gap against the cathode tank 40. That is, four anode plates 53 are attached on the four blades 52 in a detachable manner.

Meanwhile, a lid 60 is coupled to the top of the electrolyzing tank 10 through flanged portions. The lid 60 is provided with a discharge hole 61 on a side thereof, for discharging the electrolyzed waste water. A rotary joint 62 is installed at the center of the top of the lid 60 for rotatably retaining the shaft 51 of the agitator 50. A motor 70 is installed on the top of the rotary joint 62, for driving the agitator 50.

The agitator 50 includes: a shaft 51 being driven by a motor 70; agitating blades 52 attached to the shaft 51 in a radiative form; and anode plates 53 having an arcuate form and attached on the tips of the blades 52 to maintain a gap against the cathode tank 40. Between the shaft 51 and the blades 52, there is no electric conduction, but only the anodes 53 receive positive electric power. There is a gap of 1–1.5 cm between the anode plates 53 and the cathode tank 40, and the electrodes are made of a nickel based metal.

Now the apparatus of the present invention constituted as above will be described as to its operations.

First, waste water which is stored in a precipitation tank is supplied through the inlet 11 into the electrolyzing tank 10 by the power of the pump 90. Under this condition, a power of dc 12 V–20 V and 10–15 A (this being variable depending on the treating scale) is supplied to the anode plates 53 of the agitator 50, while steam is supplied through the wound steam pipe. At the same time, the motor 70 is driven to rotate the agitator 50. For example, the agitator 50 is driven at a revolution speed of 5–10 rpm.

Thus the electrolysis is carried out while heating the electrolyzing tank 10 and the driving the agitator 50. Under this condition, the incoming waste water at a temperature of 16–20° C. is raised to 60–120° C. due to the electrolysis heating and the steam heating. The waste water which is supplied through the inlet 11 flows upward gradually while being heated and electrolyzed. The holding time of the waste water within the electrolyzing tank 10 is about 5–10 minutes. That is, the driving of the pump 70 is adjusted in this manner. Meanwhile, the temperature of the waste water within the electrolyzing tank 10 is adjusted by controlling the steam supply amount and the pumping amount.

Thus the electrolysis is carried out while adjusting the temperature of the waste water. That is, external energies are added to the activation energy of the contamination materials. Then the contamination materials become unstable, and the cohesion and connection are destroyed so as to be decomposed.

Thus the apparatus for treating the industrial waste water according to the present invention uses dc 12 V and 15 A, and uses SUS 304 for the electrodes. The treating time is 5–10 minutes, and the treating temperature is raised to 60–120° C. depending on the contamination materials (waste cutting oil: 80° C., dyeing waste water: 60° C.) by supplying steam or waste steam to heat the waste water in an indirect method, thereby drastically improving the waste water treating method.

In the waste water treating apparatus of the present invention, when the size of the electrolyzing tank is 3–5 m$^3$, 20–30 tons of waste water can be treated per hour. This is known due to the fact that the treating time is about 5–10 minutes. Further, even if the power supplied to the electrodes (cathode tank and the anode plates) is low, the indirect thermal energy sufficiently activates the contamination materials. Therefore, the power consumption is reduced by about ½ compared with the conventional method.

Now the present invention will be described based on an actual example. In this example, a waste cutting oil was treated.

<EXAMPLE>

Test on treated waste cutting oil.

Waste cutting oils were collected from machine shops in a random manner. Then they were neutralized by adding limestone, caustic soda or a sulphur acidic soil up to pH 6–7. Then the apparatus of the present invention was used to treat the waste cutting oil by utilizing the steam heat and the electric energy. Then the oil removing efficiency was checked, and the checked results are shown in Table 1 below.

TABLE 1

| | Oil removal analysis | | |
|---|---|---|---|
| Test sample | Before treatment (mg/L) | After treatment (mg/L) | Efficiency (%) |
| 1 | 66000 | 3 | 99.99 |
| 2 | 66000 | 3 | 99.99 |
| 3 | 82000 | 3 | 99.99 |
| 4 | 82000 | 3 | 99.99 |
| 5 | 75000 | 3 | 99.99 |
| 6 | 76000 | 3 | 99.99 |

As shown in Table 1 above, the oil removal efficiency was 99.99%, and therefore, the treating efficiency of the present invention was proved to be superior.

According to the present invention as described above, industrial waste water can be treated by utilizing an indirect heating. Unlike in the conventional method, the color removal and the oil removal are remarkably improved in the present invention. Further, the operating time is shortened, and the thermal energy supplying device is simple, so that the apparatus can be put to a practical use. Further the operating cost is low, and the apparatus is suitable for a large scale treatment, as well as being economical.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. An apparatus for treating industrial waste water through electrolysis by utilizing steam/waste steam, comprising:

an electrolyzing tank having a waste water inlet on a bottom thereof;

a steam supply pipe wound around said electrolyzing tank, for heating said electrolyzing tank during a passing of steam through said pipe;

an insulating tube, formed inside said electrolyzing tank, having an insulating coat on inside thereof, for insulating said electrolyzing tank from its contents;

a cathode tube installed within said electrolyzing tank, for serving as a cathode during an electrolysis;

an agitator having agitating blades fixed on a shaft, said shaft being inserted into a center of said cathode tube, and anode plates being attached on tips of said blades;

an electrolyzing tank lid having a rotary joint at a center thereof to rotatably retain an upper portion of said shaft to said agitator, and having a discharge hole for discharging treated waste water; and an agitator motor installed upon said electrolyzing tank lid for rotating said agitator.

2. The apparatus as claimed in claim 1, further comprising an outer tank for maintaining a certain gap against said wound steam pipe, and for filling an insulating material into said gap to prevent heat dissipation.

3. The apparatus as claimed in claim 1, wherein said inlet is adjustable to adjust a holding time of the waste water within said electrolyzing tank.

4. The apparatus as claimed in claim 1, wherein said agitator includes:

a shaft for being driven by a motor;

agitating blades attached on said shaft in a radiative form; and anode plates having an arcuate form and attached on tips of said blades to maintain a gap against said cathode tube.

* * * * *